United States Patent
Cocchi et al.

(10) Patent No.: US 8,918,612 B1
(45) Date of Patent: *Dec. 23, 2014

(54) METHOD AND APPARATUS FOR VERIFYING MEMORY CONTENTS

(75) Inventors: Ronald P. Cocchi, Seal Beach, CA (US); Christopher P. Curren, Brentwood, CA (US); Kevin T. Collier, Gardena, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/400,256

(22) Filed: Feb. 20, 2012

Related U.S. Application Data

(63) Continuation of application No. 10/792,484, filed on Mar. 3, 2004, now Pat. No. 8,122,215, which is a continuation of application No. 10/662,549, filed on Sep. 15, 2003, now abandoned.

(51) Int. Cl.
*G06F 12/14* (2006.01)

(52) U.S. Cl.
USPC ............... 711/164; 711/E12.091; 713/189

(58) Field of Classification Search
None
See application file for complete search history.

(56) References Cited

U.S. PATENT DOCUMENTS

| | | | |
|---|---|---|---|
| 5,604,488 A * | 2/1997 | Lambropoulos | 340/5.26 |
| 5,742,616 A * | 4/1998 | Torreiter et al. | 714/732 |
| 6,212,635 B1 * | 4/2001 | Reardon | 713/165 |
| 7,434,068 B2 * | 10/2008 | Nguyen et al. | 713/193 |
| 8,122,215 B1 * | 2/2012 | Cocchi et al. | 711/164 |
| 2001/0037438 A1 * | 11/2001 | Mathis | 711/163 |

* cited by examiner

*Primary Examiner* — Denise Tran

(57) ABSTRACT

A system and method of verifying a content of a non-volatile reprogrammable memory communicatively coupled to a microprocessor is disclosed. The method comprises the steps of reading at least a portion of the data stored in the non-volatile reprogrammable memory via a second communication path secured by encryption, generating a computed integrity value according to at least a portion of the contents of the non-volatile reprogrammable memory, and reading an integrity value, and comparing the computed integrity value with the read integrity value.

24 Claims, 8 Drawing Sheets

METHOD AND APPARATUS FOR VERIFYING MEMORY CONTENTS

CROSS REFERENCE TO RELATED APPLICATIONS

This application is a continuation of U.S. patent application Ser. No. 10/792,484, entitled "METHOD AND APPARATUS FOR VERIFYING MEMORY CONTENTS," filed on Mar. 3, 2004, by Ronald P. Cocchi, Christopher P. Curren and Kevin T. Collier, issued Feb. 21, 2012 as U.S. Pat. No. 8,122,215, which is a continuation of U.S. patent application Ser. No. 10/662,549, entitled "METHOD AND APPARATUS FOR VERIFYING MEMORY CONTENTS," filed Sep. 15, 2003, by Ronald P. Cocchi, Christopher P. Curren and Kevin T. Collier, now abandoned, both of which applications are hereby reference herein.

BACKGROUND OF THE INVENTION

1. Field of the Invention

The present invention relates to systems and methods for preventing unauthorized reception of media programs and in particular to a method and apparatus for verifying the contents of a memory storing instructions for granting access to such memory programs.

2. Description of the Related Art

One method to assure the security of the media programs broadcast over such systems is through the use of a conditional access module (CAM) removably coupled to the media program receiver. The media programs are transmitted and received in encrypted form, and a decryption engine disposed in the CAM is used to decrypt such media programs so that they can be presented to the viewer. If the encryption operations in the CAM are compromised, unauthorized access to the media programs may result.

CAMs typically include a microprocessor, a memory storing microprocessor instructions, and an input/output (I/O) module. Most successful attacks on the security of the CAM occur through external, non-invasive attacks against the microprocessor instructions stored in the memory, and occur through the CAM's input/output (I/O) module. Currently, unauthorized reading and/or modification of the memory is detected by using the microprocessor to read the contents of the memory, generate a checksum, and compare that checksum to an expected checksum. However, since the microprocessor reads the memory, the attacker may gain access to the memory through some form of external attack, using the microprocessor and the I/O module.

What is needed is a method and apparatus for verifying the contents of the CAM memory which is immune to attacks through the I/O module and the microprocessor. The present invention satisfies that need.

SUMMARY OF THE INVENTION

In summary, the present invention describes a system and method of verifying a content of a non-volatile reprogrammable memory communicatively coupled to a microprocessor via a first communication path. In one embodiment, the method comprises the steps of reading at least some of the data stored in the non-volatile reprogrammable memory, computing a value related to contents of the non-volatile reprogrammable memory, and comparing the value with a stored integrity value. In another embodiment, the apparatus comprises a microprocessor, a non-volatile reprogrammable memory communicatively coupled to the microprocessor via a first communication path, the non-volatile memory for storing microprocessor program instructions, and a logical module, communicatively coupled to the non-volatile memory via a communication path independent from the first communication path, the logical module for verifying the data stored in the non-volatile reprogrammable memory by comparison of the contents of the non-volatile reprogrammable memory with a stored integrity value.

In one embodiment, the present invention incorporates a memory integrity check by the custom logic block without assistance access by the microprocessor. The memory integrity check performed by the custom logic block will protect the memory from unauthorized modification. The memory read is hidden from the microprocessor by performing the read operation directly within the custom logic block. A memory read performed in this manner is not visible to the processor or to the outside world through the system input/output module. The memory read function is protected because it is not accessible by the microprocessor and hence cannot be monitored by external means.

Most attacks occur by inappropriate manipulation of the microprocessor or memory access control unit. By limiting memory integrity check read to custom logic only, the memory content is not readily available to the attacker. Hence, the memory integrity check can be safely invoked to protect non-volatile memory from unauthorized modification. The CAM can therefore withstand substantial external attacks without inadvertently providing access to the contents of the nonvolatile memory.

This approach protects against the vast majority of inexpensive attacks, such as virtually all forms of external attacks through the system I/O module. Inhibiting this simple form of attack prevents intruders from using low cost attacks that require only a PC and $10 card reader and forces them to use high cost invasive attacks.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Figure 1:
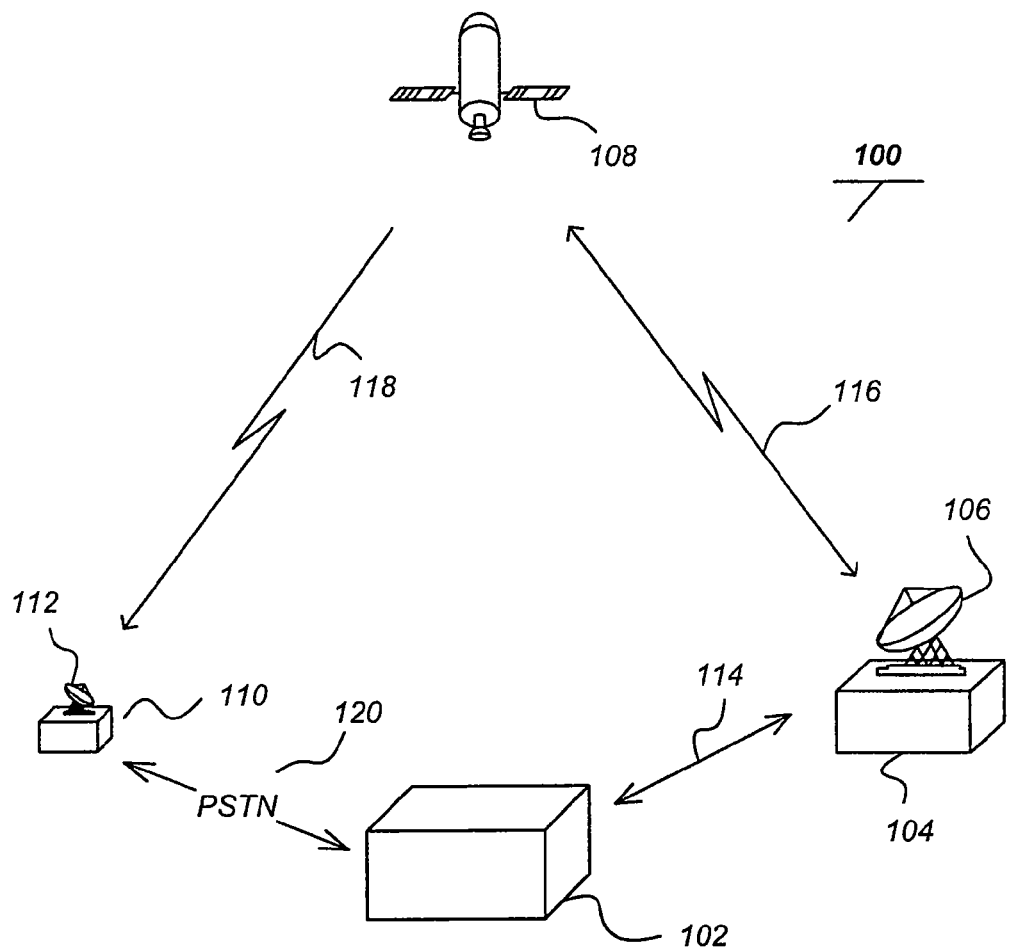
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground link 114 and with a subscriber 110 via a public switched telephone network (PSTN) or other link 120. The control center 102 provides program material to the uplink center 104, coordinates with the subscribers 110 to offer pay-per-view (PPV) program services, including billing and associated decryption of video programs.

The uplink center receives program material and program control information from the control center 102, and using an uplink antenna 106, transmits the program material and program control information to the satellite 108 via uplink 116. The satellite receives and processes this information, and transmits the video programs and control information to the subscriber via downlink 118. The subscriber 110 receives this information using the subscriber antenna 112.

In one embodiment, the subscriber antenna 112 is an 18-inch slightly oval-shaped Ku-band antenna. The slight oval shape is due to the 22.5 degree offset feed of the LNB (low noise block converter) which is used to receive signals reflected from the subscriber antenna 112. The offset feed positions the LNB out of the way so it does not block any surface area of the antenna 112 minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information as well.

Figure 2:
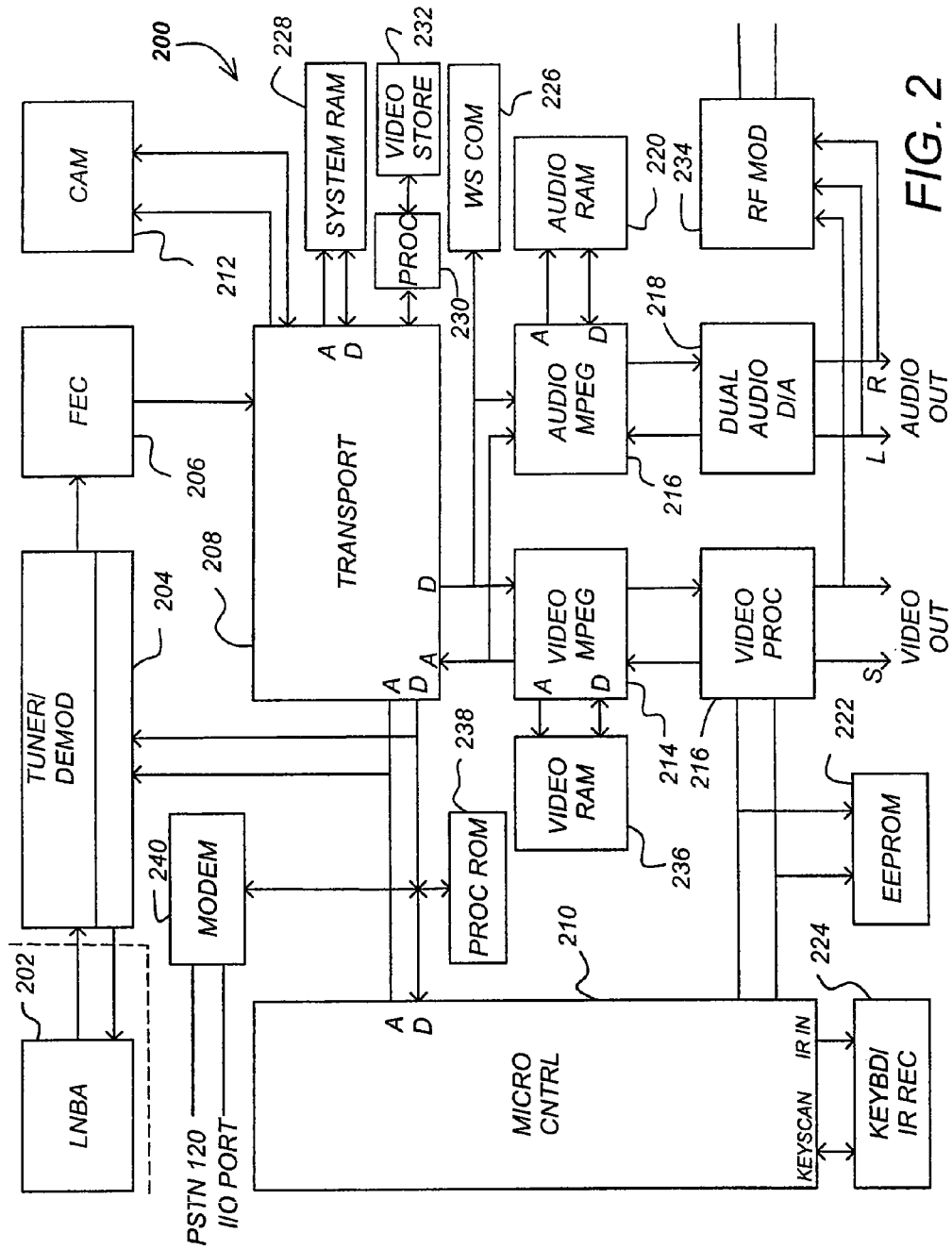
FIG. 2 is a block diagram of an integrated receiver/decoder for practicing the present invention.

FIG. 2 is a block diagram of an integrated receiver/decoder (IRD) 200 (also hereinafter alternatively referred to as receiver 200). The receiver 200 comprises a tuner/demodulator 204 communicatively coupled to the LNB 202. The LNB 202 converts the 12.2- to 12.7 GHz downlink 118 signal from the satellites 108 to, e.g., a 950-1450 MHz signal required by the receiver's 200 tuner/demodulator 204. The LNB 202 may provide either a dual or a single output. The single-output LNB 202 has only one RF connector, while the dual output LNB 202 has two RF output connectors and can be used to feed a second receiver or some other form of distribution system.

The tuner/demodulator 204 isolates a single, digitally modulated 24 MHz transponder, and converts the modulated data to a digital data stream. The digital data stream is then supplied to a forward error correction (FEC) decoder 206. This allows the receiver 200 to reassemble the data transmitted by the uplink center 104 (which applied the forward error correction to the desired signal before transmission to the subscriber 110) verify that the correct data signal was received, and correct errors, if any. The error-corrected data may be fed from the FEC decoder module 206 to the transport module via an 8-bit parallel interface.

the transport module 208 performs many of the data processing functions performed by the receiver 200. The transport module 208 processes data received from the FEC decoder module 206 and provides the processed data to the video MPEG decoder 214 and the audio MPEG decoder 216. In one embodiment of the present invention, the transport module, video MPEG decoder and audio MPEG decoder are all implemented on integrated circuits. This design promotes both space and power efficiency, and increases the security of the functions performed within the transport module 208. The transport module 208 also provides a passage for communications between the microcontroller 210 and the video and audio MPEG decoders 214, 216. As set forth more fully hereinafter, the transport module also works with the CAM 212 to determine whether the subscriber 110 is permitted to access certain program material. Data from the transport module can also be supplied to external communication module 226. The operations performed by the transport module are further illustrated and described with respect to FIG. 3.

The CAM 212 functions in association with other elements to decode an encrypted signal from the transport module 208. The CAM 212 may also be used for tracking and billing these services. In one embodiment of the present invention, the CAM 212 is a smart card, having contacts cooperatively interacting with contacts in the receiver 200 to pass information. In order to implement the processing performed in the CAM 212, the receiver 200, and specifically the transport module 208 provides a clock signal to the CAM 212.

Video data is processed by the MPEG video decoder 214. Using the video random access memory (RAM) 236, the MPEG video decoder 214 decodes the compressed video data and sends it to an encoder or video processor 216, which converts the digital video information received from the video MPEG module 214 into an output signal usable by a display or other output device. By way of example, processor 216 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if ATSC high definition programming is processed.

Audio data is likewise decoded by the MPEG audio decoder 216. The decoded audio data may then be sent to a Digital to analog (D/A) converter 218. In one embodiment of the present invention, the D/A converter 218 is a dual D/A converter, one for the right and left channels. If desired, additional channels can be added for use in surround sound processing or secondary audio programs (SAPs). In one embodiment of the invention, the dual D/A converter 218 itself separates the left and right channel information, as well as any additional channel information. Other audio formats may similarly be supported. For example multi-channel digital audio formats, such as DOLBY DIGITAL AC-3 may be used.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

Microcontroller 210 receives and processes command signals from the remote control 224, a receiver 200 keyboard interface, and/or another input device. The microcontroller receives commands for performing its operations from a processor programming memory, which permanently stores such instructions for performing such commands. The processor programming memory may comprise a read only memory (ROM) 238, an electrically erasable programmable read only memory (EEPROM) or, similar memory device. The microcontroller 210 also controls the other digital devices of the receiver 200 via address and data lines (denoted "A" and "D" respectively, in FIG. 2).

The modem 240 connects to the customer's phone line via the PSTN port 120. It calls e.g., the program provider and transmits the customer's program purchases for billing purposes, and/or other information. The modem 240 is controlled by the microprocessor 210. The modem 240 can output data to other I/O port types including standard parallel and serial computer I/O ports.

The present invention also comprises a local storage unit such as the video storage device 232 for storing video and/or audio data obtained from the transport module 208. Video storage device 232 can be a hard disk drive, a read/writeable compact disc of DVD, a solid state RAM, or any other storage medium. In one embodiment of the present invention, the video storage device 232 is a hard disk drive with specialized parallel read/write capability so that data may be read from the video storage device 232 and written to the device 232 at the same time. To accomplish this feat, additional buffer memory accessible by the video storage 232 or its controller may be used. Optionally, a video storage processor 230 can be used to manage the storage and retrieval of the video data from the video storage device 232. The video storage processor 230 may also comprise memory for buffering data passing into and out of the video storage device 232. Alternatively or in combination with the foregoing, a plurality of video storage devices 232 can be used. Also alternatively or in combination with the foregoing, the microcontroller 210 can also perform the operations required to store and/or retrieve video and other data in the video storage device 232.

The video processing module 216 output can be directly supplied as a video output to a viewing device such as a video or computer monitor. In addition the video and/or audio outputs can be supplied to an RF modulator 234 to produce an RF output and/or 8 vestigal side band (VSB) suitable as an input signal to a conventional television tuner. This allows the receiver 200 to operate with televisions without a video output.

Each of the satellites 108 comprises a transponder, which accepts program information from the uplink center 104, and relays this information to the subscriber 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the receiver 200 also receives and stores a program guide in a memory available to the microcontroller 210. Typically, the program guide is received in one or more data packets in the data stream from the satellite 108. The program guide can be accessed and searched by the execution of suitable operation steps implemented by the microcontroller 210 and stored in the processor ROM 238. The program guide may include data to map the channel numbers to satellite transponders and service channel identifications (SCIDs), and also provide TV program listing information to the subscriber identifying program events.

Figure 3:
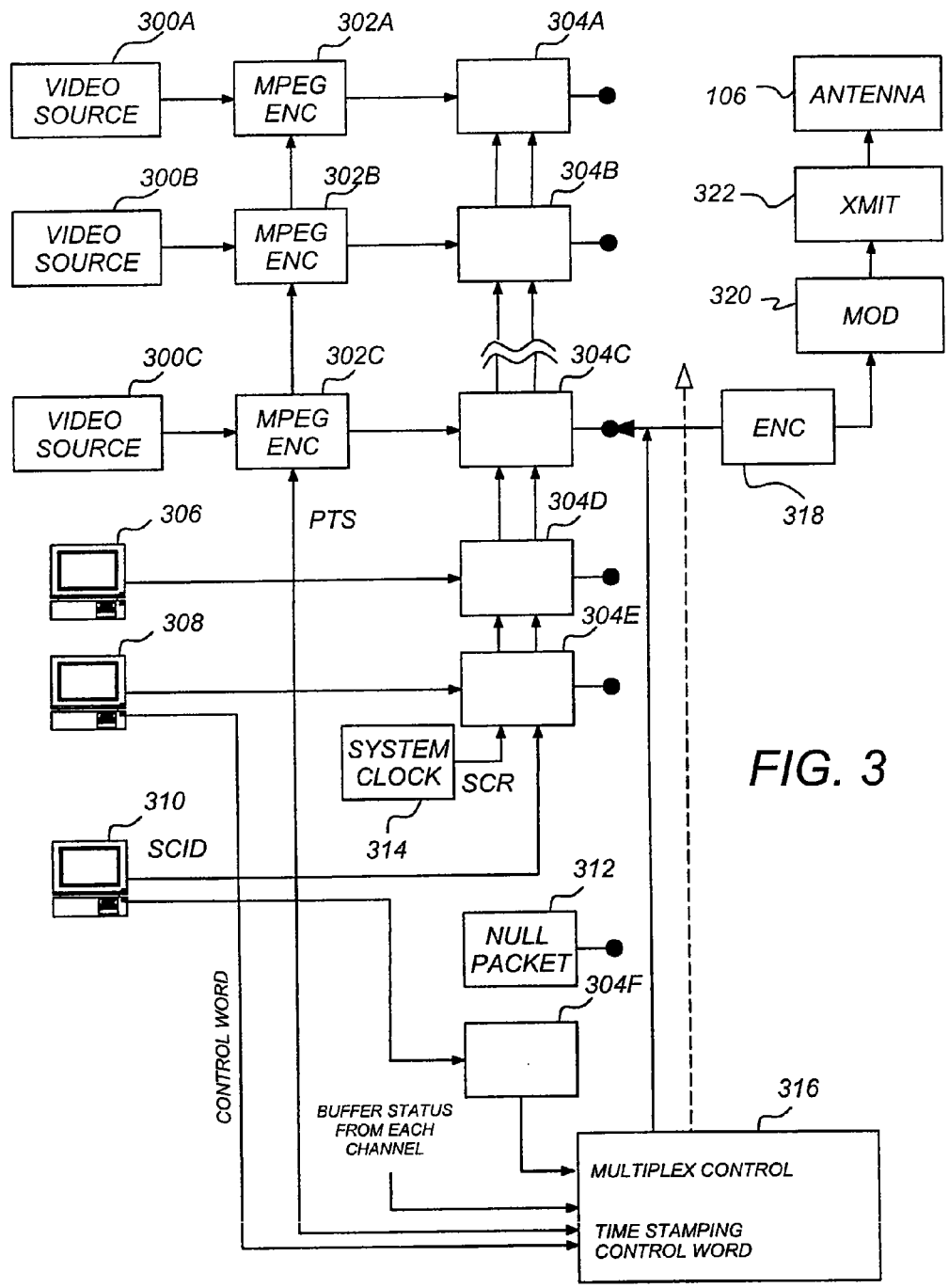
FIG. 3 is a block diagram showing a typical uplink configuration showing how video program material is uplinked to a satellite for transmission to subscribers using a single transponder.

FIG. 3 is a block diagram showing a typical uplink configuration for a single satellite 108 transponder, showing how video program material is uplinked to the satellite 108 by the control center 102 and the uplink center 104. FIG. 3 shows three video channels (which could be augmented respectively with one or more audio channels for high fidelity music, soundtrack information, or a secondary audio program for transmitting foreign languages), and a data channel from a computer data source 306.

The video channels are provided by a program source of video material 300A-300C (collectively referred to hereinafter as video source(s) 300). The data from each video program source 300 is provided to an encoder 302A-302C (collectively referred to hereinafter as encoder(s) 302). Each of the encoders accepts a program time stamp (PTS) from the controller 316. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 302 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 302, the signals are converted into data packets by a packetizer 304A-304F (collectively referred to hereinafter as packetizer(s) 304) associated with each source 300.

The data packets are assembled using a reference from the system clock 314 (SCR), and from the conditional access manager 308, which provides the SCID to the packetizers 304 for use in generating the data packets. These data packets are then multiplexed into serial data and transmitted.

Figure 4A:
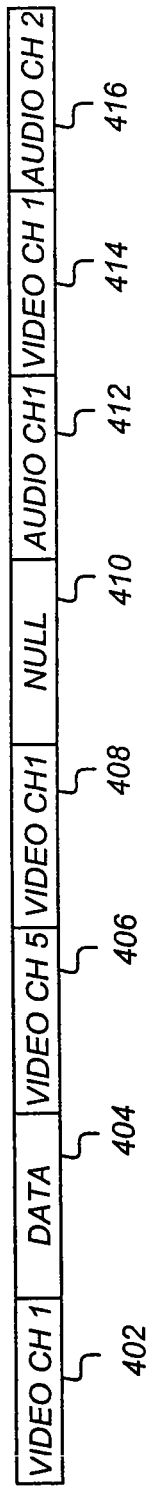
FIG. 4A is a diagram of a representative data stream received from a satellite.

FIG. 4A is a diagram of a representative data stream. The first packet segment 402 comprises information from video channel 1 (data coming from, for example, the first video program source 300A). The next packet segment 404 comprises computer data information that was obtained, for example from the computer data source 306. The next packet segment 406 comprises information from video channel 5 (from one of the video program sources 300), and the next packet segment includes information from video channel 1 (again, coming from the first video program source 300A). The data stream therefore comprises a series of packets from any one of the data sources in an order determined by the controller 316. The data stream is encrypted by the encryption module 318, modulated by the modulator 320 (typically using a QPSK modulation scheme), and provided to the transmitter 322, which broadcasts the modulated data stream on a frequency bandwidth to the satellite via the antenna 106. The receiver 200 receives these signals, and using the SCID, reassembles the packets to regenerate the program material for each of the channels. As shown in FIG. 4A, null packets created by the null packet module 312 may be inserted into the data stream as desired.

Figure 4B:
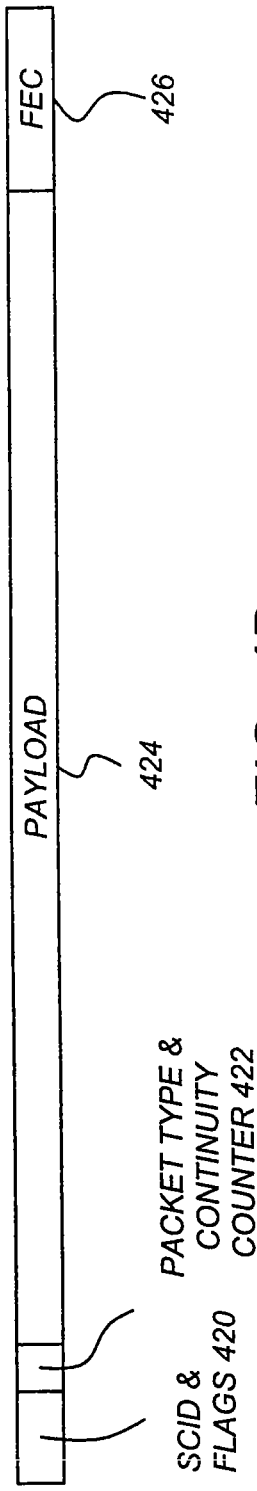
FIG. 4B is a diagram illustrating the structure of a data packet.

FIG. 4B is a diagram of a data packet. Each data packet (e.g. 402-416) is 147 bytes long, and comprises a number of packet segments. The first packet segment 420 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 422 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 424 comprises 127 bytes of payload data, which is a portion of the video program provided by the video program source 300. The final packet segment 426 is data required to perform forward error correction.

Figure 5:
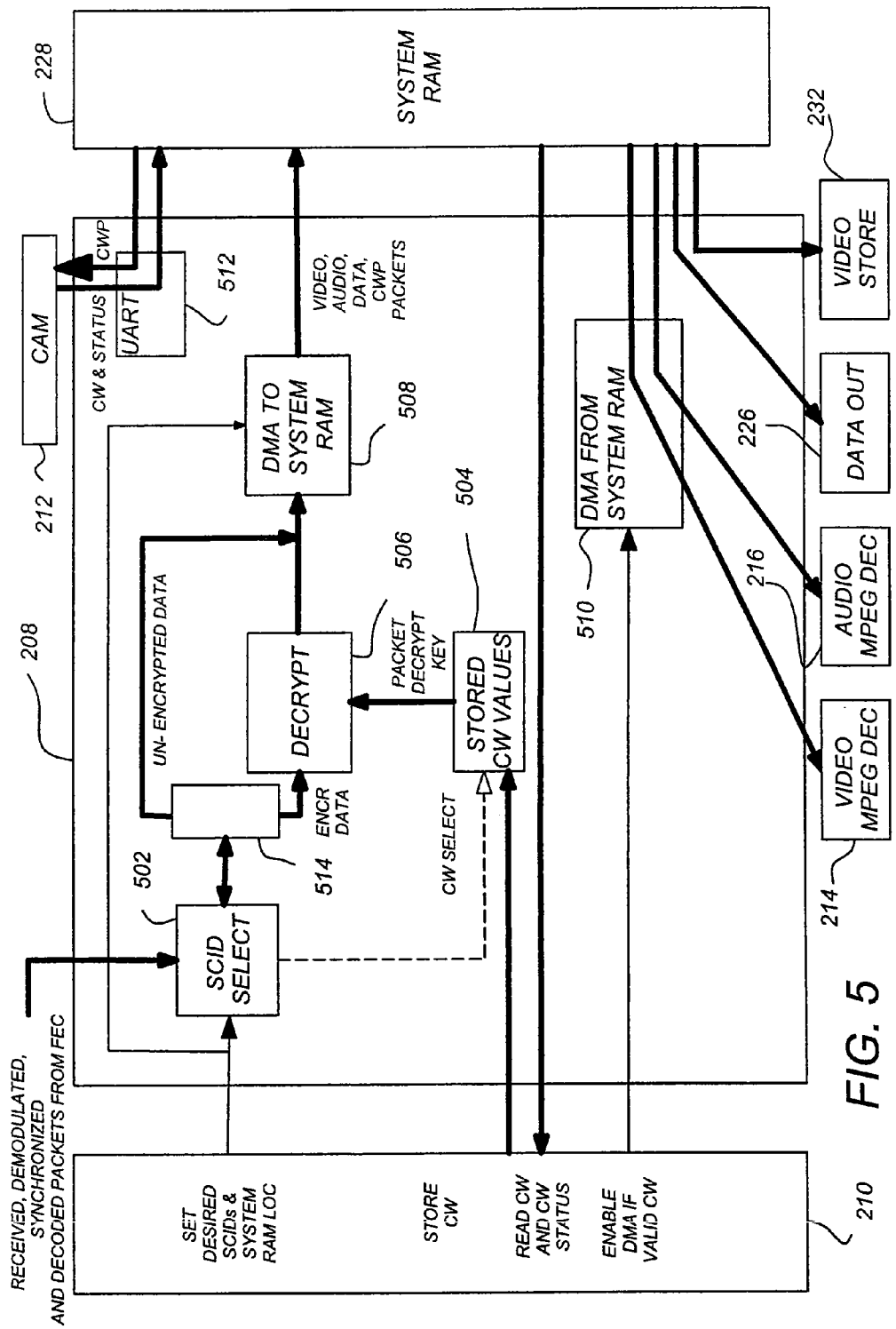
FIG. 5 is a block diagram illustrating transport module functions.

FIG. 5 is a block diagram showing additional detail regarding the operations of the transport module. The data packets which are received, demodulated, synchronized and reverse FEC coded from the FEC module 206 are provided to a demultiplexer such as the SCID select module 502. Program selection information is processed by the microcontroller 210, and used to select the one or more SCIDs associated with the desired program (a program may be separated into several streams, each with an associated SCID).

The SCID select module compares the selected SCID or SCIDs with the SCIDs for the incoming packets, and passes those packets with SCIDs matching the selected channel(s). For single channel service, non-selected packets (packets without the subscriber-selected SCID) are simply discarded.

In the typical case where a video program comprises multiple stream elements, the SCID select module 502 passes the required packets. If more than one channel is desired (e.g. to allow the reception and recording multiple channels at a time while simultaneously viewing them) the SCID select module 502 passes these to the stream elements for the additional channels as well.

In the preferred embodiment, all program material is encrypted. For viewing encrypted programming, the receiver 200 is responsible for verifying that access should be granted, and if so, decrypting the data packets so the program material can be viewed by the subscriber. For unencrypted programming, the data router 514 directs the data packets directly in the system RAM 228 via DMA 508.

Each data packet is associated with a control word packet (CWP) that is received by the transport module 208. The CWP encodes each program to prevent tampering, and is used by the CAM 212 to generate a CW and a CW status, which are stored in the CW memory 504. The CW is used to enable data packets to be retrieved from the system RAM 228 and provided to the video MPEG decoder 214 and/or audio MPEG decoder 216, and may also be used to decrypt the data packet itself.

Encrypted data packets must be decrypted before presentation to the user. This is accomplished by routing encrypted data packets to the decrypt module 506. These encrypted data packets are then decrypted and stored in the system RAM 228 for DMA access by the MPEG decoders 214, 216.

In one embodiment, the decryption process is accomplished as follows. In response to a user demand and while retrieving the stored first segment for presentation to the user, a message is transmitted to the IRD 200 separately identifying each of the subsequent segments of the selected video program and the user to the program source such as the control center 102 or the uplink center 104. A code or key such as the package information parcel (PIP) is then received by the IRD 200. The key is later used to decrypt the encrypted segments so the video program can be viewed by the user.

In another embodiment, a message is transmitted to the IRD 200 separately identifying each of the subsequent segments of the selected video program and the user to the program source such as the control center 102 or the uplink center 104. In response, a plurality of codes or keys are transmitted and received by the IRD 200, and each of the keys is used to decrypt an associated one of the encrypted subsequent segments.

Figure 6:
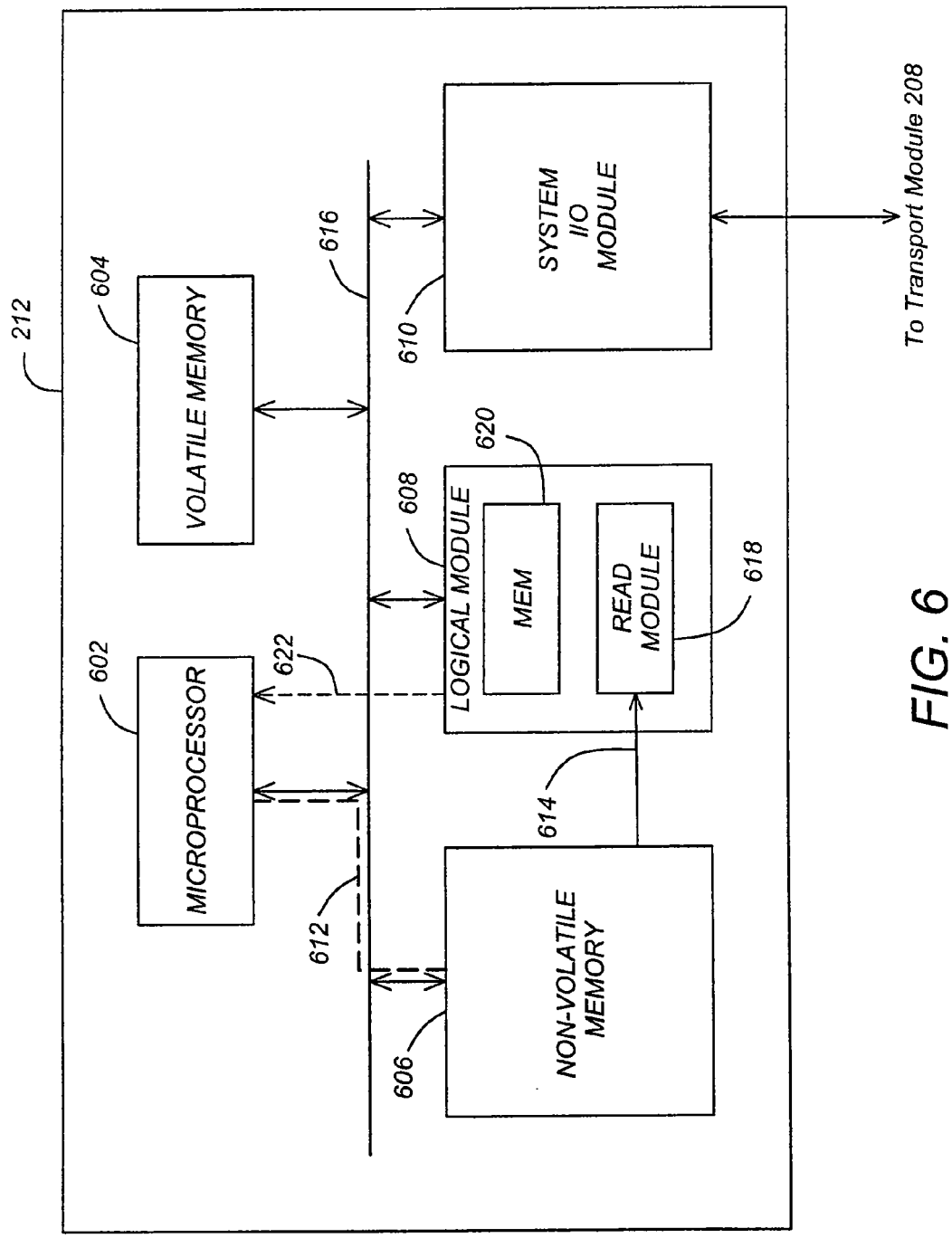
FIG. 6 is a diagram illustrating one embodiment of the CAM.

FIG. 6 is a diagram depicting one embodiment of the CAM 212. The CAM 212 comprises a microprocessor 602, a first memory 604, a second memory 606, a logical module 608 and an I/O module 610. Each of these elements are communicatively coupled via a bus 616. The I/O module 610 accepts commands and data from the transport module 208 interprets those commands and data, if necessary, and provides them to the bus 616, where they can be distributed to the other elements 602-608 of the CAM 212. In one embodiment, the first memory is a volatile memory 604 for storing temporary data and instructions used by the microprocessor 602. Such temporary data and instructions are lost when power is removed from the CAM 212. In one embodiment, the volatile memory 604 comprises a random access memory (RAM). In one embodiment, the second memory 606 stores program instructions and other data that are used by the microprocessor 602 to perform CAM functions. Since microprocessor 602 function-implementing instructions are stored in the second memory 604, the second memory typically comprises a non-volatile memory 606 that retains the contents of the memory 606 even in the absence of power.

The logical module 608 is directly coupled to the second memory 606 by a communication path 614 that is independent from the communication path 612 that is used to communicate information between the second memory 606 and the microprocessor 602. In one embodiment of the present invention, the data transmitted from the second memory 606 to the logical module 608 is encrypted. The logical module 608 verifies the data stored in the second memory 606 by comparing at least a portion of the contents of the second memory with a stored integrity value. In one embodiment the integrity value is stored independently of the second memory 606. For example, the integrity value can be stored in internal microprocessor 602 memory, the first memory 604, or in the logical module 608 itself. In embodiments wherein the integrity value is stored in the first memory 604 internal memory of the microprocessor 602 or anywhere else that is subject to compromise, the integrity value can be digitally signed so that any changes in the integrity value will be manifested in the signature, and thus detected. The logical module 608 can be implemented by a state module, a custom logic block, or a special or general purpose multiprocessor.

In the illustrated embodiment, the logical module 608 includes a read module 618, which reads the data stored in the second memory 606. The read module 618 can read the entire contents of the second memory 606, or just a portion thereof. The logical module 608 also comprises a memory evaluation module (MEM) 620, which computes a value (e.g. a checksum) related to the memory contents read by the read module 618 and compares the computed value with the integrity value.

The logical module 608 reports the result of the comparison between the integrity value and the computed value to the microprocessor 602. If the comparison indicates that the contents of the second memory 606 have been tampered with, the microprocessor can disable any further functionality until the proper instructions are loaded in the second memory 606. The logical module 608 can also report the result of the comparison between the integrity value and the computed value to the system I/O module 610, and thereafter to the transport module 208, if desired. Further, the CAM 212 can include a direct connection 622 between the logical module 608 and the microprocessor 602 to provide the result of the comparison between the computed value and the integrity value, either in the form of data, or in the form of a state of a voltage on the direct connection. For example, if the comparison indicates that the data in the second memory 606 has been tampered with, the logic module 608 can remove power from the processor 602.

Figure 7:
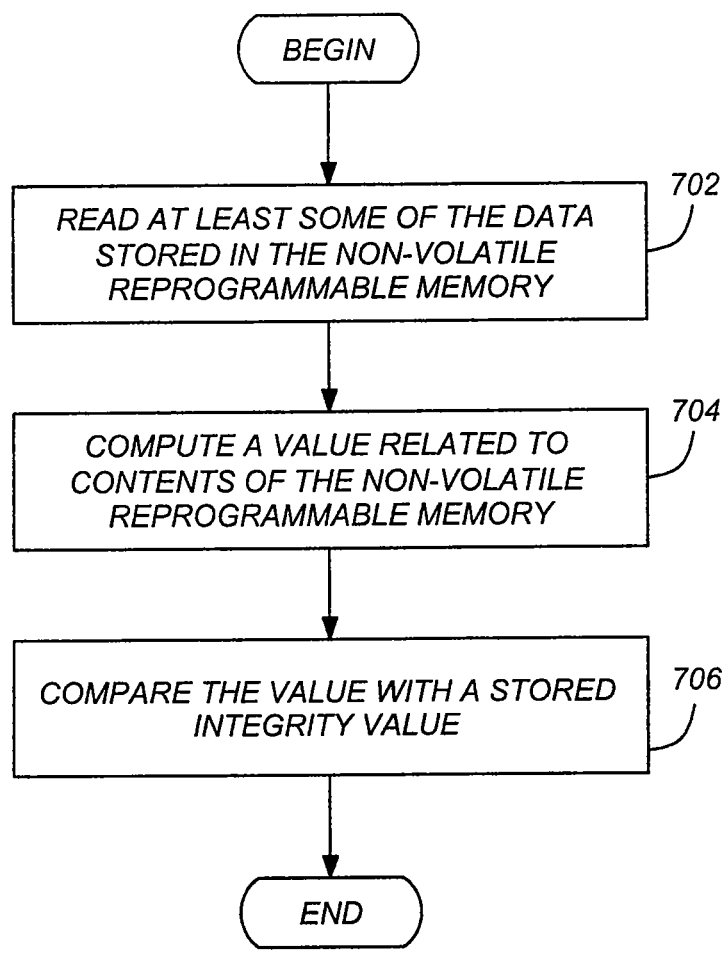
FIG. 7 is a diagram depicting exemplary method steps that can be used to practice the present invention.

FIG. 7 is a diagram depicting exemplary method steps that can be used to practice the invention described in reference to FIG. 6. In block 702, at least some of the data stored in the second memory 606 is read. In one embodiment, all of the data stored in the second memory 606 is read in this operation. Next, a value related to the contents of the second memory 606 is computed, as shown in block 704. Preferably, this is accomplished by the logic module 608, as described above. In one embodiment, the value is a checksum computed from the data read from the second memory 606. The computed value is compared with an integrity value stored independently from the second memory 606, as shown in block 706. In one embodiment, the integrity value is read from memory 604 communicatively coupled to the microprocessor 602. To assure that the integrity value is not compromised, it can be verified by comparison with a signature of the integrity value.

Figure 8:
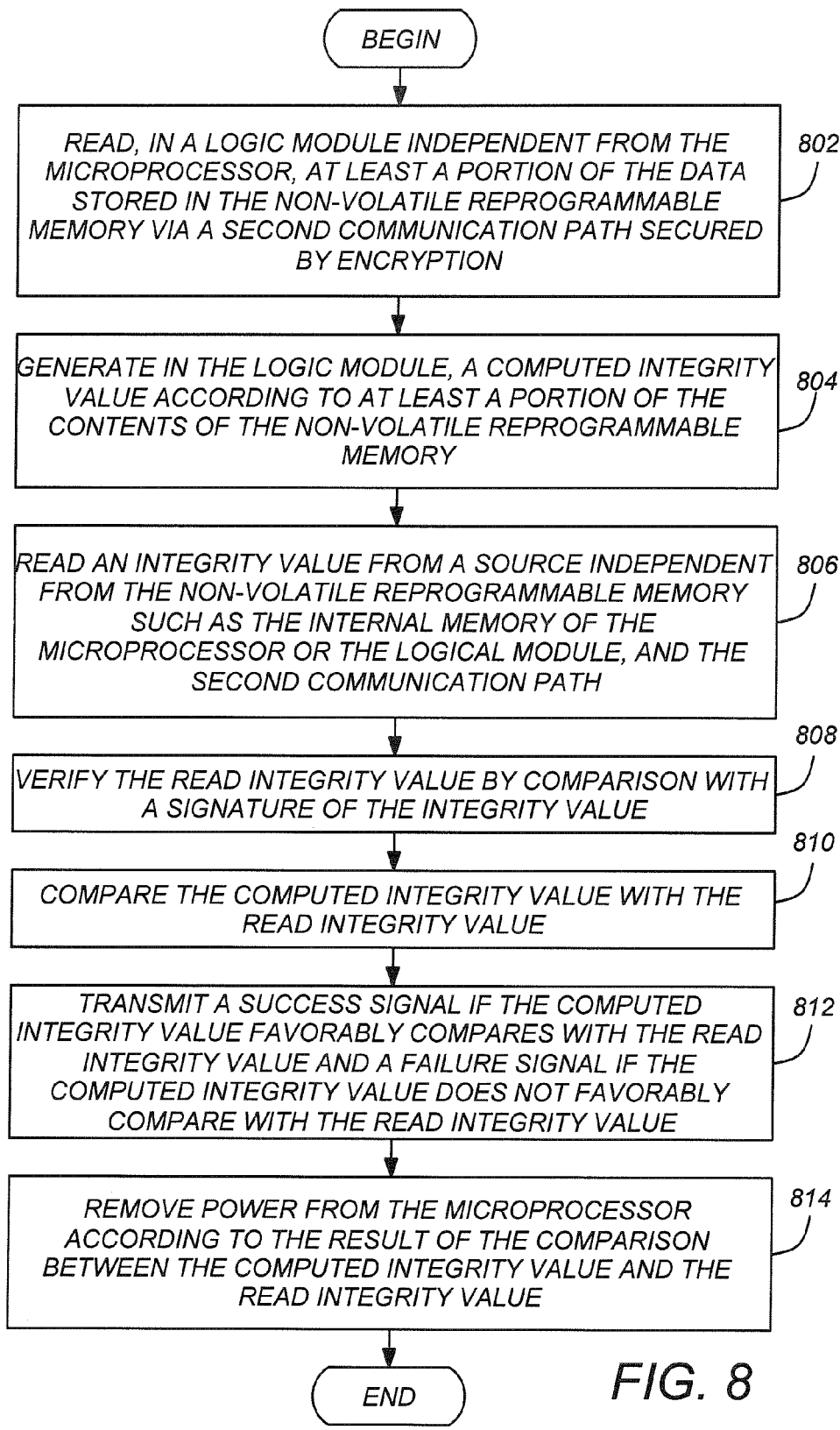
FIG. 8 is a diagram depicting further exemplary method steps that can be used to practice one embodiment of the present invention.

FIG. 8 is a diagram depicting further exemplary method steps that can be used to practice one embodiment of the present invention. Block 802 illustrates reading, in a logic module independent from the microprocessor, at least a portion of the data stored in the non-volatile reprogrammable memory via a second communication path secured by encryption. Block 804 illustrates generating, in the logic module, a computed integrity value according to at least a portion of the contents of the non-volatile reprogrammable memory. Block 806 illustrates reading an integrity value from a source independent from the non-volatile reprogrammable memory and the second communication path. Block 808 illustrates verifying the read integrity value by a comparison with a signature of the integrity value. Block 810 illustrates comparing the computed integrity value with the read integrity value. Block 812 illustrates transmitting a success signal if the computed integrity value favorably compares with the read integrity value and a failure signal if the computed integrity value does not favorably compare with the read integrity value. Block 814 removing power from the microprocessor according to the result of the comparison between the computed integrity value and the read integrity value.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus, comprising:
a microprocessor;
a non-volatile reprogrammable memory communicatively coupled to the microprocessor via a first communication path, the non-volatile reprogrammable memory for storing data including microprocessor program instructions; and
a logical module, communicatively coupled to the non-volatile reprogrammable memory via a second communication path independent from the first communication path, the logical module for securely reading at least a portion of the data stored in the non-volatile reprogrammable memory, for reading a stored integrity value from a source independent from the non-volatile reprogrammable memory and the second communication path, and for verifying the at least a portion of the data stored in the non-volatile reprogrammable memory according to the read at least a portion of the data stored in the non-volatile reprogrammable memory and the read integrity value;
wherein the stored integrity value is read from an internal memory of the microprocessor.

2. The apparatus of claim 1, wherein the logical module verifies all of the data stored in the non-volatile reprogrammable memory.

3. The apparatus of claim 1, wherein the logical module verifies only a portion of the data stored in the non-volatile reprogrammable memory.

4. The apparatus of claim 1, wherein:
the logical module generates a computed integrity value from the at least a portion of the data stored in the non-volatile reprogrammable memory and the at least a portion of the data stored in the non-volatile programmable memory is verified by comparing the computed integrity value with the read integrity value.

5. The apparatus of claim 1, wherein the logical module further reports a result of the comparison to the microprocessor.

6. The apparatus of claim 5, wherein:
the microprocessor is communicatively coupled to the logical module via a third communication path independent of the first communication path and the second communication path; and
wherein the result of the comparison is reported via the third communication path.

7. The apparatus of claim 1, wherein the logical module removes power from the microprocessor according to the result of the comparison.

8. A method of verifying a content of a non-volatile reprogrammable memory communicatively coupled to a microprocessor via a first communication path, the non-volatile memory for storing data including microprocessor program instructions, the method comprising the steps of:
reading, in a logic module independent from the microprocessor, at least a portion of the data stored in the non-volatile reprogrammable memory via a second communication path independent from the first communication path;
generating, in the logic module, a computed integrity value according to the read at least a portion of the data;
reading an integrity value from a source independent from the non-volatile reprogrammable memory and the second communication path; and comparing the computed integrity value with the read integrity value;

wherein the source independent from the non-volatile reprogrammable memory is an internal memory of the microprocessor.

9. The method of claim 8, further comprising the step of transmitting a success signal if the computed integrity value favorably compares with the read integrity value and a failure signal if the computed integrity value does not favorably compare with the read integrity value.

10. The method of claim 9, wherein the success signal is transmitted to the microprocessor via a third communication path independent from the first communication path and the second communication path.

11. The method of claim 8, further comprising the step of removing power from the microprocessor according to the comparison of the computed integrity value and the read integrity value.

12. An apparatus, comprising:
a microprocessor;
a non-volatile reprogrammable memory communicatively coupled to the microprocessor via a first communication path, the non-volatile reprogrammable memory for storing data including microprocessor program instructions; and
a logical module, communicatively coupled to the non-volatile reprogrammable memory via a second communication path independent from the first communication path, the logical module for securely reading at least a portion of the data stored in the non-volatile reprogrammable memory, for reading a stored integrity value from a source independent from the non-volatile reprogrammable memory and the second communication path, and for verifying the at least a portion of the data stored in the non-volatile reprogrammable memory according to the read at least a portion of the data stored in the non-volatile reprogrammable memory and the read integrity value;
wherein the microprocessor is communicatively coupled to the logical module via a third communication path independent of the first communication path and the second communication path; and
wherein the logical module further reports a result of the comparison to the microprocessor via the third communication path.

13. The apparatus of claim 12, wherein the logical module verifies all of the data stored in the non-volatile reprogrammable memory.

14. The apparatus of claim 12, wherein the logical module verifies only a portion of the data stored in the non-volatile reprogrammable memory.

15. The apparatus of claim 12, wherein:
the logical module generates a computed integrity value from the at least a portion of the data stored in the non-volatile reprogrammable memory and the at least a portion of the data stored in the non-volatile programmable memory is verified by comparing the computed integrity value with the read integrity value.

16. The apparatus of claim 12, wherein the stored integrity value is read from a memory communicatively coupled to the logical module.

17. The apparatus of claim 12, wherein the stored integrity value is read from an internal memory of the microprocessor.

18. The apparatus of claim 12, wherein the stored integrity value is read from the logical module.

19. The apparatus of claim 12, wherein the logical module removes power from the microprocessor according to the result of the comparison.

20. A method of verifying a content of a non-volatile reprogrammable memory communicatively coupled to a microprocessor via a first communication path, the non-volatile memory for storing data including microprocessor program instructions, the method comprising the steps of:
reading, in a logic module independent from the microprocessor, at least a portion of the data stored in the non-volatile reprogrammable memory via a second communication path independent from the first communication path;
generating, in the logic module, a computed integrity value according to the read at least a portion of the data;
reading an integrity value from a source independent from the non-volatile reprogrammable memory and the second communication path;
comparing the computed integrity value with the read integrity value; and
transmitting a success signal if the computed integrity value favorably compares with the read integrity value and a failure signal if the computed integrity value does not favorably compare with the read integrity value, wherein the success signal is transmitted to the microprocessor via a third communication path independent from the first communication path and the second communication path.

21. The method of claim 20, wherein the source independent from the non-volatile reprogrammable memory is an internal memory of the microprocessor.

22. The method of claim 20, wherein the source independent from the non-volatile reprogrammable memory is the logical module.

23. The method of claim 20, further comprising the step of:
verifying the read integrity value by a comparison with a signature of the integrity value.

24. The method of claim 20, further comprising the step of removing power from the microprocessor according to the comparison of the computed integrity value and the read integrity value.

* * * * *